United States Patent Office 3,378,436
Patented Apr. 16, 1968

3,378,436
PROCESS FOR CONTROLLING INSECTS WITH PHENYLTHIOCROTONATE
Edward Everett Ivy, Devon, Pa., assignor to Pennsalt Chemicals Corporation, Philadelphia, Pa., a corporation of Pennsylvania
No Drawing. Filed Mar. 22, 1966, Ser. No. 536,302
1 Claim. (Cl. 167—30)

ABSTRACT OF THE DISCLOSURE

Control of insects with phenyl thiocrotonate.

In accordance with the invention insecticidal compositions are provided comprising an inert carrier and phenyl thiocrotonate, and the invention also embodies the process of controlling insects with this compound. It is unexpected that phenyl thiocrotonate is an active insecticide since phenylcrotonate appears to lack any insecticidal activity.

Phenyl thiocrotonate may be applied undiluted onto insects, upon infested plants and soil, or it may be formulated into insecticidal compositions by preparing solutions or dispersions of the active agent in one or more of the common solvents normally used as a carrier. Thus, for example the active agents may be dissolved in organic liquids such as ketones (acetone, methyl ethyl ketone, etc.), amides (dimethylacetamide, dimethylformamide, etc.), aromatic hydrocarbons such as benzene, toluene, and xylene, alcohols and glycols, and various oxygen containing industrial organic solvents and the like. Dispersions may also be prepared by diluting the organic solvent system with water in the presence or absence of a surface active agent, and the formulations of the invention may also be employed in aerosol formulations where difluorodichloromethane and similar aerosol propellants are used to form the propellant and dispersion. Likewise, the active agent may be formulated into dusts and powders where the inert carrier will be a clay such as fuller's earth, china clay, kaolin, attapulgite, bentonite and the related aluminum silicates. Other finely-divided inorganic solids may also be used as a carrier, and in general, dusts prepared for this type of formulation will have a particle size below about 200 mesh and contain the active ingredient at a concentration ranging from about 0.5 to about 90% by weight of the total formulation. The formulations may be sprayed or dusted in the usual manner onto the particular subtrate to be protected against insect attack.

The concentration of active agent in the formulations will vary widely depending upon the particular type and upon the particular method of application. In general formulations containing from about 0.1 to about 75% by weight will be used. Rates of application will vary also depending upon the insect and the crop to be protected, but in general rates of application from 0.25 to 5 pounds per acre will be used.

Phenyl thiocrotonate may also be applied directly to crops (such as cotton) in undiluted form in accordance with airplane application techniques now being used with malathion and other known insecticides.

The active agent is effective against mosquito larvae, cabbage worm, bollworm, cabbage looper, tent caterpillar, corn rootworm, tussock moth larvae, potato leaf hopper, and onion maggot. Phenyl thiocrotonate is particularly effective against mosquito larvae, bollworm and cabbage looper.

In order to further illustrate the invention, the following examples are given:

EXAMPLE 1

A 0.1% solution of phenyl thiocrotonate in acetone was prepared and this solution subsequently diluted with water to a concentration of active agent of 10 p.p.m. Mosquito larvae (*Aedes aegyegi*) were placed in this test solution and after 48 hours 95% kill was observed. When phenyl crotonate was evaluated under the same test conditions no kill of mosquito larvae was observed.

EXAMPLE 2

A 0.1% solution of phenyl thiocrotonate was placed in a 16 ounce wide-mouth jar and the jar rotated to deposit the phenyl thiocrotonate on the sides and bottom of the jar as the acetone solvent evaporates. In this way a concentration of 0.2 mg./cm.$^2$ on the inside jar surface was obtained. Then twenty adult German cockroaches (*Blatella germanica*) were put in the jar and observed. After 48 to 72 hours 100% kill was observed.

EXAMPLE 3

Third instar bollworm (*Heliothis zea*) larvae were treated topically with acetone solutions of phenyl thiocrotonate at various concentrations. At 1, 10, 100 and 1000 micrograms of active agent per larvae, 30, 70, 90 and 100 percent kill respectively was attained.

EXAMPLE 4

Soil treated by mixing it with active agent was placed in petri dishes and Northern Rootworm adults introduced into the soil. The following table shows the data and the control obtained with phenyl thiocrotonate and a commercial insecticide, Aldrin:

| Agent | Dosage, p.p.m. | Percent Control | | | |
|---|---|---|---|---|---|
| | | 4 hrs. | 12 hrs. | 24 hrs. | 48 hrs. |
| Phenyl thiocrotonate | 50 | 100 | 100 | 100 | 100 |
| Aldrin | 50 | 20 | 80 | 80 | 100 |
| Control | | 0 | 0 | 0 | 0 |

It will be understood that numerous changes and variations may be made from the above description and examples without departing from the spirit and scope of the invention.

I claim:
1. A process for controlling bollworm insects which comprises contacting said insects with an insecticidal amount of phenyl thiocrotonate.

References Cited
UNITED STATES PATENTS
2,212,895   8/1940   Allen _____ 260—455

ALBERT T. MEYERS, *Primary Examiner.*
D. R. MAHANAND, *Assistant Examiner.*